US006904191B2

(12) United States Patent
Kubby (10) Patent No.: US 6,904,191 B2
(45) Date of Patent: Jun. 7, 2005

(54) MXN CANTILEVER BEAM OPTICAL WAVEGUIDE SWITCH

(75) Inventor: Joel A. Kubby, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 52 days.

(21) Appl. No.: 10/703,382

(22) Filed: Nov. 7, 2003

(65) Prior Publication Data

US 2004/0184720 A1 Sep. 23, 2004

Related U.S. Application Data

(60) Provisional application No. 60/456,086, filed on Mar. 19, 2003.

(51) Int. Cl.[7] ............................................... G02B 6/35
(52) U.S. Cl. ...................................................... 385/16
(58) Field of Search ................. 385/16–23; 977/DIG. 1

(56) References Cited

U.S. PATENT DOCUMENTS

| | | | | |
|---|---|---|---|---|
| 5,024,500 A | * | 6/1991 | Stanley et al. | ................. 385/16 |
| 5,078,514 A | | 1/1992 | Valette et al. | ................. 385/20 |
| 5,612,815 A | | 3/1997 | Labeye et al. | ............... 359/320 |
| 5,909,078 A | | 6/1999 | Wood et al. | ................. 310/307 |
| 6,303,885 B1 | | 10/2001 | Hichwa et al. | ............. 200/181 |
| 6,388,359 B1 | | 5/2002 | Duelli et al. | ................. 310/309 |
| 6,407,478 B1 | | 6/2002 | Wood et al. | ................. 310/307 |
| 6,428,173 B1 | | 8/2002 | Dhuler et al. | ............... 359/872 |
| 6,487,330 B2 | * | 11/2002 | Horino et al. | ................. 385/16 |
| 6,842,558 B2 | * | 1/2005 | Mitsuoka et al. | ............. 385/23 |

OTHER PUBLICATIONS

Watts, R. and Soref, R.A., "Electromechanical Optical Switching and Modulation in Micromachined Silicon–on–Insulator Waveguides", IEEE Int. SOI Conference Proceedings, 1991, p. 62.

Eng, T.T.H.; Sin, S.S.Y.; Kan, S.C. and Wong, G.K.L., "Surface–micromachined Movable SOI Optical Waveguides", Transducers '95, 8th Int. Conf. on Solid–State Sensors and Actuators, and Eurosensors IX, 1995, pp. 348–350.

Eng, T.T.H.; Sin, S.S.Y.; Kan, S.C. and Wong, G.K.L., "Micromechanical Optical Switching with Voltage Control Using SOI Movable Integrated Optical Waveguides", IEEE Photonics Tech. Letters, vol. 7, No. 11, Nov. 1995, pp. 1297–1299.

Ollier, E. and Mottier, P., "Integrated electrostatic micro–switch for optical fibre networks driven by low voltage", Electronics Letters, Oct. 10, 1996, vol. 32, No. 21, pp. 2007–2009.

(Continued)

Primary Examiner—Akm Enayet Ullah
Assistant Examiner—Jerry T Rahll
(74) Attorney, Agent, or Firm—Oliff & Berridge, PLC (57) ABSTRACT

An optical micro-electro-mechanical system (MEMS) switch is disclosed. In a preferred embodiment the optical MEMS switch is used as an M×N optical signal switching system. The optical MEMS switch comprises a plurality of optical waveguides formed on a cantilever beam platform for switching optical states wherein the state of the optical switch is changed by a system of drive and latch actuators. The optical MEMS device utilizes a latching mechanism in association with a thermal drive actuator for aligning the cantilever beam platform. In use the optical MEMS device may be integrated with other optical components to form planar light circuits (PLCs). When switches and PLCs are integrated together on a silicon chip, compact higher functionality devices, such as Reconfigurable Optical Add-Drop Multiplexers (ROADMs), may be fabricated.

20 Claims, 11 Drawing Sheets

OTHER PUBLICATIONS

Bezzaoui, H. and Voges, E., "Integrated optics combined with micromechanics on silicon", Sensors and Actuators A. 29 (1991), pp. 219–223.

Ollier, E; Chabrol, C.; Enot T.; Brunet–Manquat, P.; Margail, J. and Mottier, P., "1×8 Micro–Mechanical Switches Based on Moving Waveguides for Optical Fiber Network Switching", IEEE, 2000.

Ollier, E; Labeye, P. and Revol, F, "Micro–opto mechanical switch integrated on silicon", Electronics Letters, Nov. 9, 1995, vol. 31, No. 23, pp. 2003–2005.

U.S. Appl. No. 10/712,200.

U.S. Appl. No. 10/721,724.

U.S. Appl. No. 10/712,203.

* cited by examiner

MXN CANTILEVER BEAM OPTICAL WAVEGUIDE SWITCH

This application claims the benefit of Provisional Patent Application No. 60/456,086, filed Mar. 19, 2003.

CROSS-REFERENCE TO RELATED APPLICATIONS

Attention is directed to now abandoned provisional applications U.S. Provisional Application No. 60/456,063, filed Mar. 19, 2003, entitled, "MEMS Optical Latching Switch" and U.S. Provisional Application No. 60/456,087, filed Mar. 19, 2003, entitled, "MEMS Waveguide Shuttle Optical Latching Switch". The disclosure of each of these now abandoned provisional applications are hereby incorporated by reference in their entirety.

BACKGROUND

This invention in embodiments relates to microelectromechanical system (MEMS) switches and more particularly to multiple state optical latching switches.

The telecommunications industry is undergoing dramatic changes with increased competition, relentless bandwidth demand, and a migration toward a more data-centric network architecture. First generation point-to-point wave division multiplex systems have eased the traffic bottleneck in the backbone portion of a network. As a new cross-connect architecture moves the technology closer to the subscriber side of the network, operators are challenged to provide services at the optical layer, calling for more flexible networks that can switch and reroute wavelengths. This is placing great emphasis and demand for wavelength agile devices.

The need to provide services "just in time" by allocation of wavelengths, and further migration of the optical layer from the high-capacity backbone portion to the local loop, is driving the transformation of the network toward an all optical network in which basic network requirements will be performed in the optical layer.

The optical network is a natural evolution of point-to-point dense wavelength division multiplexing (DWDM) transport to a more dynamic, flexible, and intelligent networking architecture to improve service delivery time. The main element of the optical network is the wavelength (channel), which will be provisioned, configured, routed, and managed in the optical domain. Intelligent optical networking will be first deployed as an "opaque" network in which periodic optical-electrical conversion will be required to monitor and isolate signal impairments. Longer range, the optical network will evolve to a "transparent" optical network in which a signal is transported from its source to a destination totally within the optical domain.

A key element of the emerging optical network is an optical add/drop multiplexer (OADM). An OADM will drop or add specific wavelength channels without affecting the through channels. Fixed OADMs can simplify the network and readily allow cost-effective DWDM migration from simple point-to-point topologies to fixed multi-point configurations. True dynamic OADM, in which reconfiguration is done in the optical domain without optical-electrical conversion, would allow dynamically reconfigurable, multi-point DWDM optical networks. This dynamically reconfigurable multi-point architecture is slated to be the next major phase in network evolution, with true OADM an enabling network element for this architecture.

On chip integration of optical switching and planar light circuits has the potential to greatly reduce the size and manufacturing costs of multi-component optical equipment such as Reconfigurable Optical Add/Drop Multiplexers (ROADMs). Current costs for Reconfigurable Optical Add/Drop Multiplexers (ROADMs) are $1,000 per channel, limiting their use to long-haul optical telecommunications networks. In order to extend their use into the metropolitan network the cost will need to be decreased by an order of magnitude to $100 per channel, without sacrificing performance.

One solution to decreasing cost is through the integration of components, where the primary cost savings will be in packaging. A number of approaches are being pursued for optical integration using Planar Light Circuit (PLC) technologies. The majority of approaches use a silica-on-silicon platform with the ROADM formed from the integration of silica Arrayed Waveguide Gratings (AWG's) for multiplexing and demultiplexing, with Thermo-Optic (TO) switches for performing the add/drop and pass of the demultiplexed signal. The use of a low-index contrast silica-on-silicon platform severely limits the yield of these components due to the requirement for uniform thick oxide films over large areas to form the waveguides. The use of TO switches limits the extensibility due to high-power requirements and thermal cross-talk.

A number of different materials and switching technologies are being explored for fabricating chip-scale photonic lightwave circuits such as AWG's for demultiplexers and multiplexers, Variable Optical Attenuators (VOA's) and Reconfigurable Optical Add-Drop Multiplexers (ROADMs). The main material platforms include silica wafers, silica-on-silicon substrates using both thin film deposition and wafer bonding techniques, polymer waveguides defined on silicon substrates, and silicon-on-insulator substrates. The main switching technologies include Mach-Zehnder interferometers based on either a thermo-optic or electro-optic effect, and MEMS mechanical waveguide switches.

While silica waveguides have optical properties that are well matched to the optical properties of conventional single mode fibers, and thus couple well to them, they require thick cladding layers due to the low index of refraction contrast between the waveguide core and cladding materials, making them difficult to fabricate using planar processing techniques for fabrication and integration with other on-chip optical devices. The low index of refraction contrast, $\Delta n$, between core and cladding also requires large bending radii to limit optical loss during propagation through the photonic lightwave circuit, leading to large chip footprints and low die yields (<50%).

In addition, silica based waveguide switches are typically based on Mach-Zehnder interference using thermo-optic effects, that have a limited Extinction Ratio (ER) of around 25–30 dB, require significant power due to the low thermo-optic coefficient of silica, have problems with thermal cross-talk between the different optical channels and have a sinusoidal rather than a digital optical response. They also lose their switching state when power is lost.

What is needed is a Silicon-On-Insulator (SOI) platform for monolithically integrating optical, mechanical and electrical functions. The use of a silicon platform enables fabrication of components using the vast infrastructure and process development available for semiconductor IC manufacturing at silicon foundries. By fabricating the MEMS switches and waveguides in the same material, single crystal silicon, there are no stress and strain issues as exist with heterogeneous materials sets such as silica-on-silicon. Fabrication in silicon also allows for integration with CMOS microelectronics for control and sensing capabilities, and for free-carrier plasma dispersion effects to enable signal leveling using integrated VOA's. The high index contrast of silicon (n=3.5) enables the ridge waveguide structures to make tight turns with minimum optical bending loss, decreasing overall chip size to centimeter dimensions.

SUMMARY

An optical micro-electro-mechanical system (MEMS) switch is disclosed. In a preferred embodiment the optical MEMS switch is used as an M×N optical signal switching system. The optical MEMS switch comprises a plurality of optical waveguides formed on a flexible cantilever beam platform for switching optical states wherein the state of the optical switch is changed by a system of drive and latch actuators. The optical MEMS device utilizes a latching mechanism in association with a thermal drive actuator for aligning the cantilever beam platform. In use the optical MEMS device may be integrated with other optical components to form planar light circuits (PLCs). When switches and PLCs are integrated together on a silicon chip, compact higher functionality devices, such as Reconfigurable Optical Add-Drop Multiplexers (ROADMs), may be fabricated.

BRIEF DESCRIPTION OF THE DRAWINGS

The drawings are not to scale and are only for purposes of illustration.

DETAILED DESCRIPTION

Figure 1:
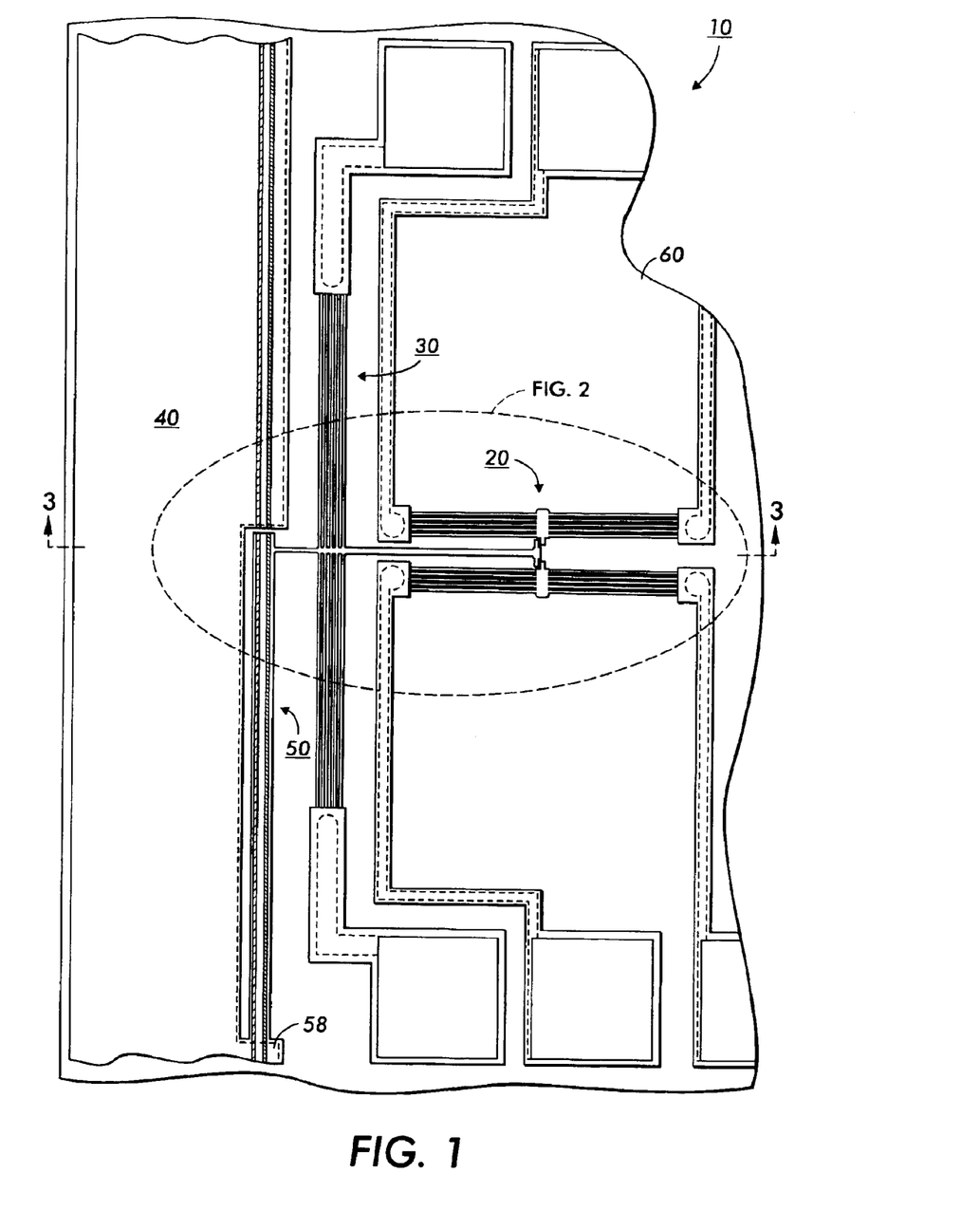
FIG. 1 is a cut away top plan view of an optical MEMS (Micro Electro Mechanical System) switch in accordance with the present invention.

Referring now to FIG. 1 there is shown a cut away top plan view of an optical MEMS (Micro Electro Mechanical System) switch 10. All components shown are fabricated in single-crystal silicon 60 using a self-aligned process. The optical MEMS switch 10 utilizes a latching mechanism 20 in association with a thermal drive actuator 30 for aligning a flexible cantilever beam platform 50 fixed at one end 58. The flexible cantilever beam defines one or more movable waveguides for switching to one or more stationary waveguides 40. All components shown may be fabricated in the device layer of an SOI wafer and released by sacrificial etching of the buried oxide layer. In use the optical MEMS switch 10 may be integrated with planar light circuits (PLCs). When switches and PLCs are integrated together on a silicon chip higher functionality devices, such as Reconfigurable Optical Add-Drop Multiplexers (R-OADM), may be fabricated.

Figure 2:
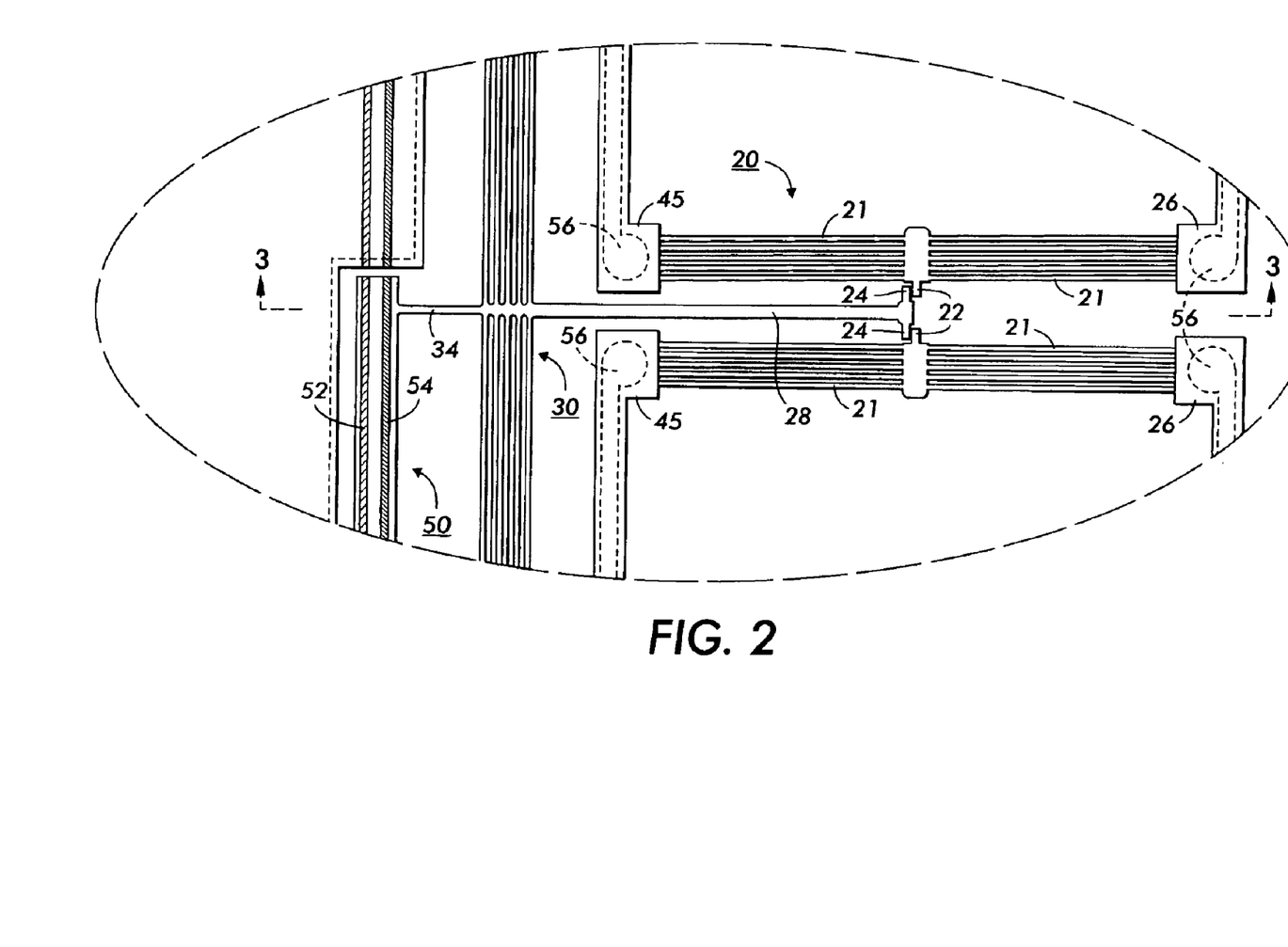
FIG. 2 is an enlarged view of a portion of FIG. 1 for illustrative purposes.
Figure 3:
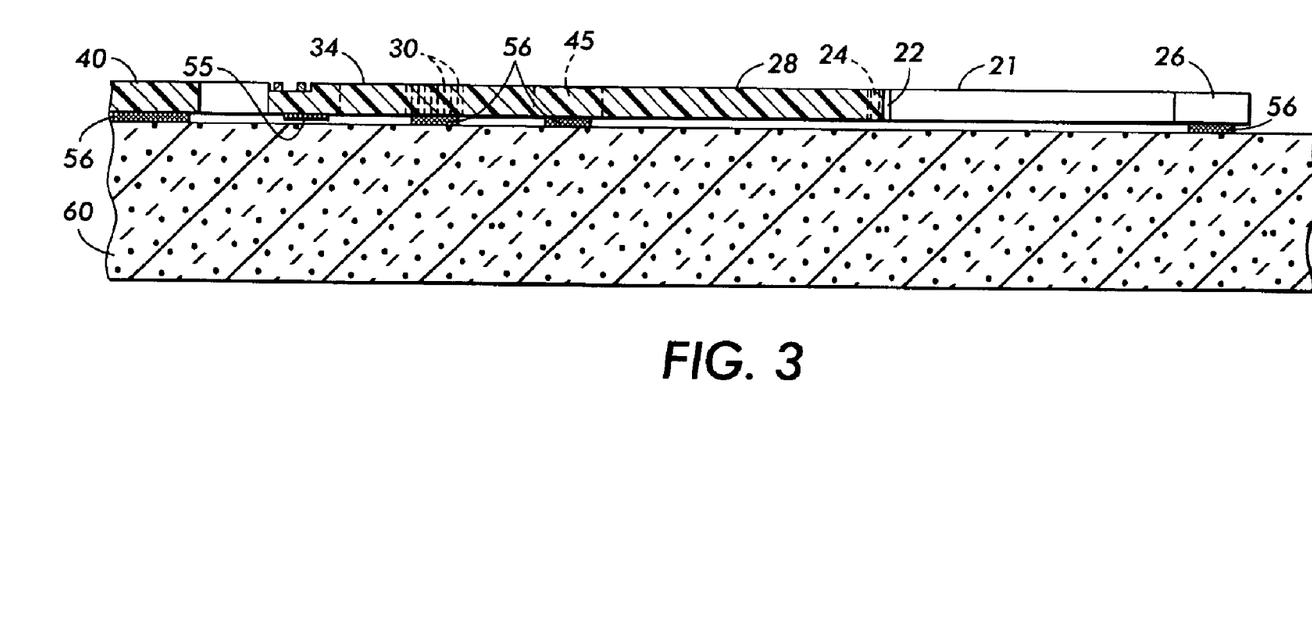
FIG. 3 is a side cross-sectional view of FIG. 2.

As shown in FIGS. 1 through 3, the optical switch 10 comprises one or more thermal drive actuators 30 having associated during fabrication one or more thermal latch actuators 21, each thermal latch actuator 21 defining translating latch teeth 22. The flexible cantilever beam platform 50 defines a plurality of optical waveguides 52 and 54. A tether 34 connects the one or more thermal drive actuators 30 to the flexible cantilever beam platform 50. A linkage 28 connects the thermal drive actuators 30 to a set of linkage teeth 24 wherein the linkage teeth 24 are contacted by the latch teeth 22 when the latch is engaged. The linkage teeth 24 and latch teeth 22 are spatially located to determine one or more latched state positions wherein electrical stimuli is timed to actuate the thermal drive 30 and thermal latch actuators 21 so as to switch between equilibrium and latched states as will be more fully described below.

The optical MEMS switch 10 is applicable as an optical switch in a variety of applications, such as optical fiber transmission networks, to route optical signals along various signal paths. Switches are typically characterized by the number of input and output ports, referred to as M×N. For example, a 1×3 switch would switch one input between three outputs. M×N switches have previously be implemented using waveguide shuttles or by cascading a series of M 1×N cantilever switches. While shuttle switches can provide the M×N switching functionality, they require at least two gaps in the optical pathway, which leads to increased optical losses. Similarly, a series of M cascaded cantilever switches would have M optical gaps which leads to increased optical losses for M>1. By fabricating an M×N cantilever beam waveguide switch, where a cantilever beam carrying M waveguides is deflected rather than a waveguide shuttle, only one optical gap is required in the optical pathway, cutting the optical loss associated with propagation through the gaps in half. Alternatively M cantilever beams, each carrying a single waveguide, can be flexibly connected so that they all actuate together.

Turning once again to FIGS. 1 through 5 there is shown the optical switch 10 with two optical waveguides 52 and 54 formed on the flexible cantilever beam platform 50 for switching between two stationary optical waveguides 42 and 44, respectively. This configuration enables two optical signals to be switched at the same time. By including additional optical waveguides, additional signals may be switched simultaneously. The ability to switch multiple signals at the same time is important in many optical applications. For example, in an R-OADM (Reconfigurable Optical Add/Drop Multiplexer), when an input signal is dropped, a new signal can be added to the output. Since the add/drop function always occurs simultaneously, it is possible to decrease the number of required optical switches by implementing a single cantilever switch that performs the add drop function on both the input signal, sending it to the drop line, and the add signal, sending it to the switch's output. Referring to FIG. 3, The optical multiple state latching switch 10 uses polysilicon anchors 56 to attach components to the substrate 60. The optical multiple state latching switch 10 also incorporates using polysilicon dimples 55. The dimple 55 may be a protuberance that hangs down halfway into the gap. The dimple 55 resembles a stalactite that hangs down halfway into the gap from the top surface, similar to the anchors 56, but only halfway through the gap and are placed to avoid stiction of the released components to the substrate 60.

Figure 4:
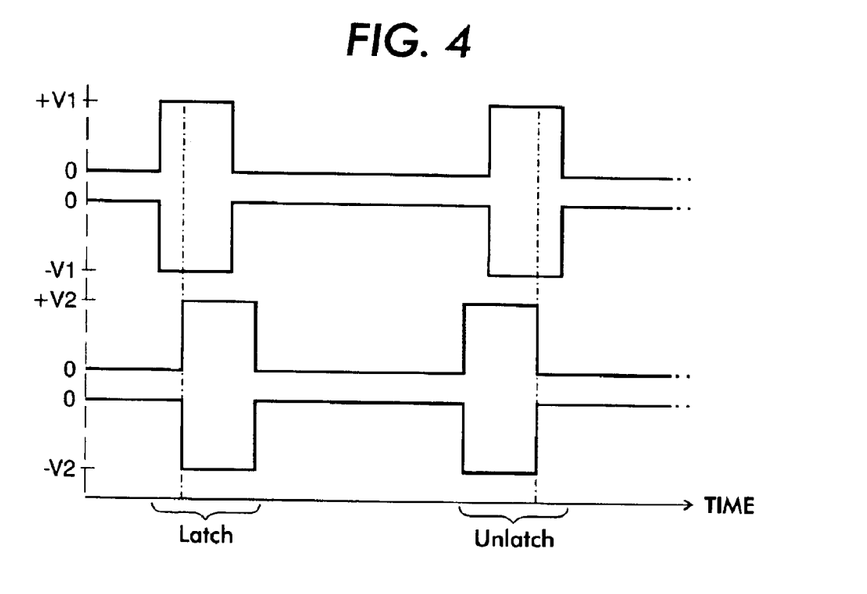
FIG. 4 is a graphically view of a timing diagram for controlling a latch and drive switch shown in FIGS. 1 and 2.
Figure 5:
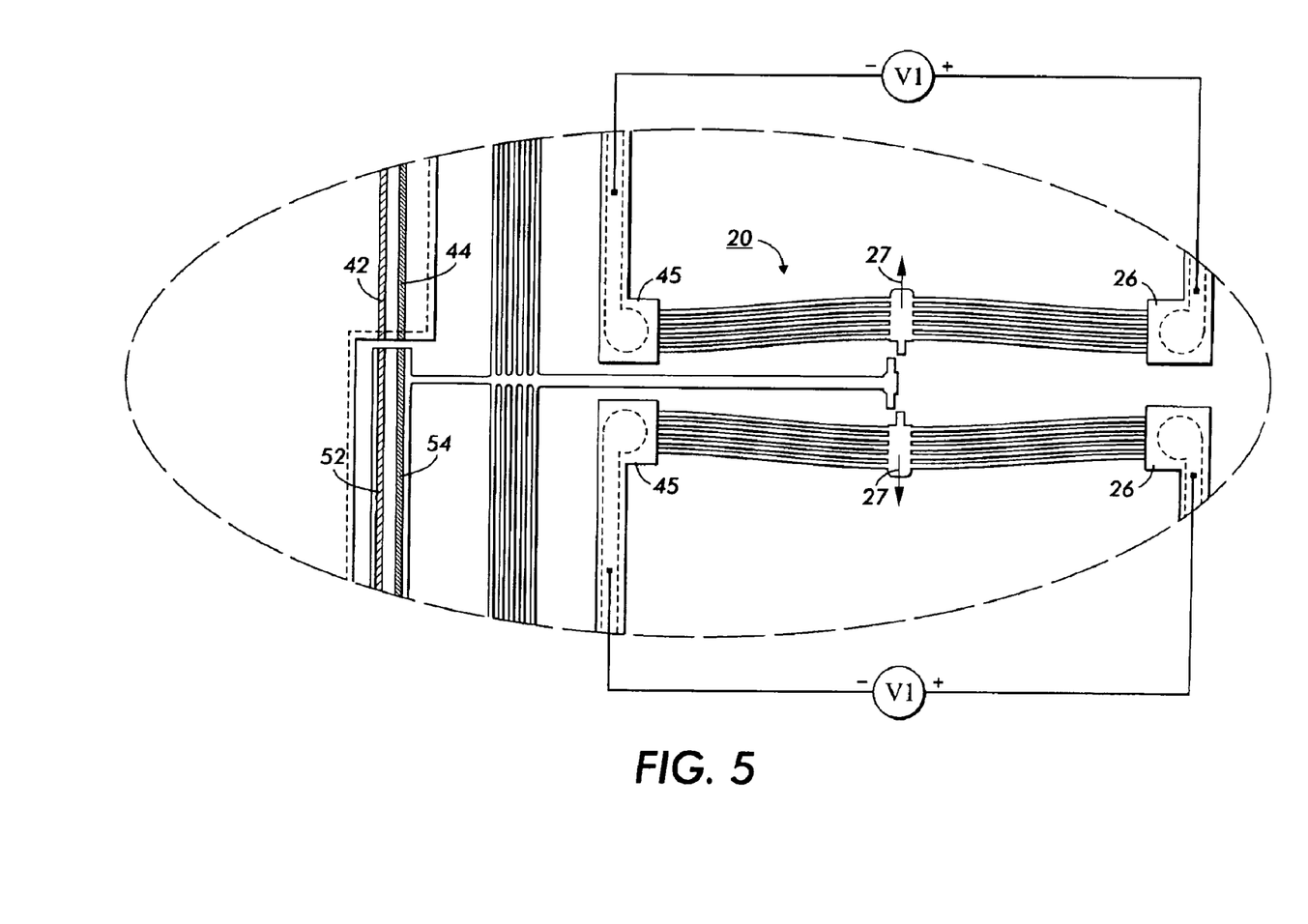
FIG. 5 is a top plan view showing the latch actuated to an open position.

Referring now to FIG. 4 there is graphically illustrated the timing sequence of the signals used to actuate the drive and latch mechanisms for the 2×2 switch illustrated in FIG. 1, where the voltages are labeled in FIG. 4 assuming the potential of the handle wafer or base substrate 60 is zero. The first portion of the timing diagram shows the latching sequence. The first step in the latching sequence is to apply a voltage +V1 to one end 26 of each latch actuator 21, and a voltage −V1 to the other end 45 of each latch actuator 21. The voltages on the latch actuators induce ohmic heating in the actuator beams, causing thermal expansion and the subsequent opening (direction 27) of the latch as shown in FIG. 5. While the latch actuator voltage is still applied, the drive actuator 30 is stimulated with a voltage +V2 at one end 31 and a voltage −V2 at the other end 33.

Figure 6:
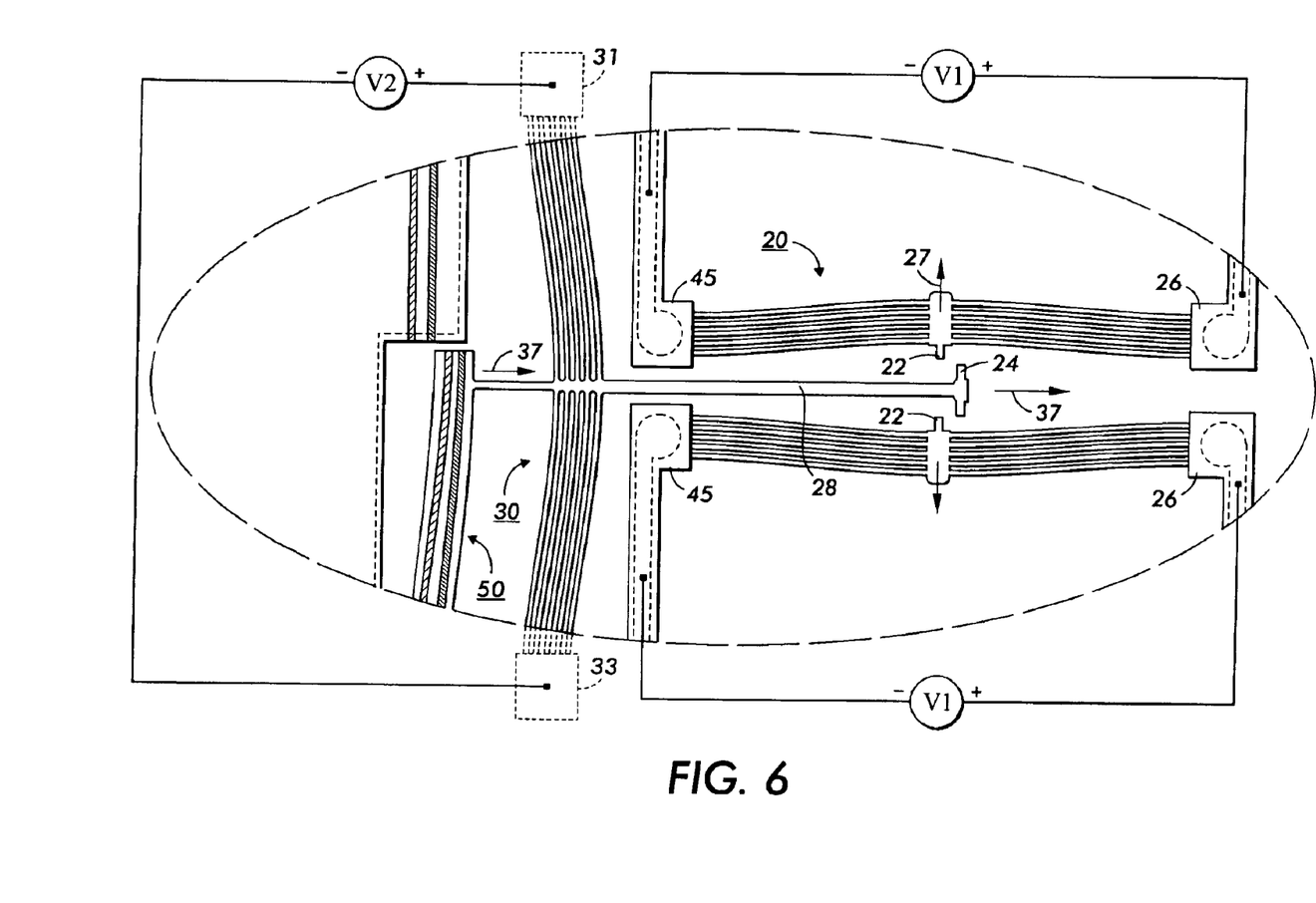
FIG. 6 is a top plan view showing the drive switch actuated to an overshoot position.
Figure 7:
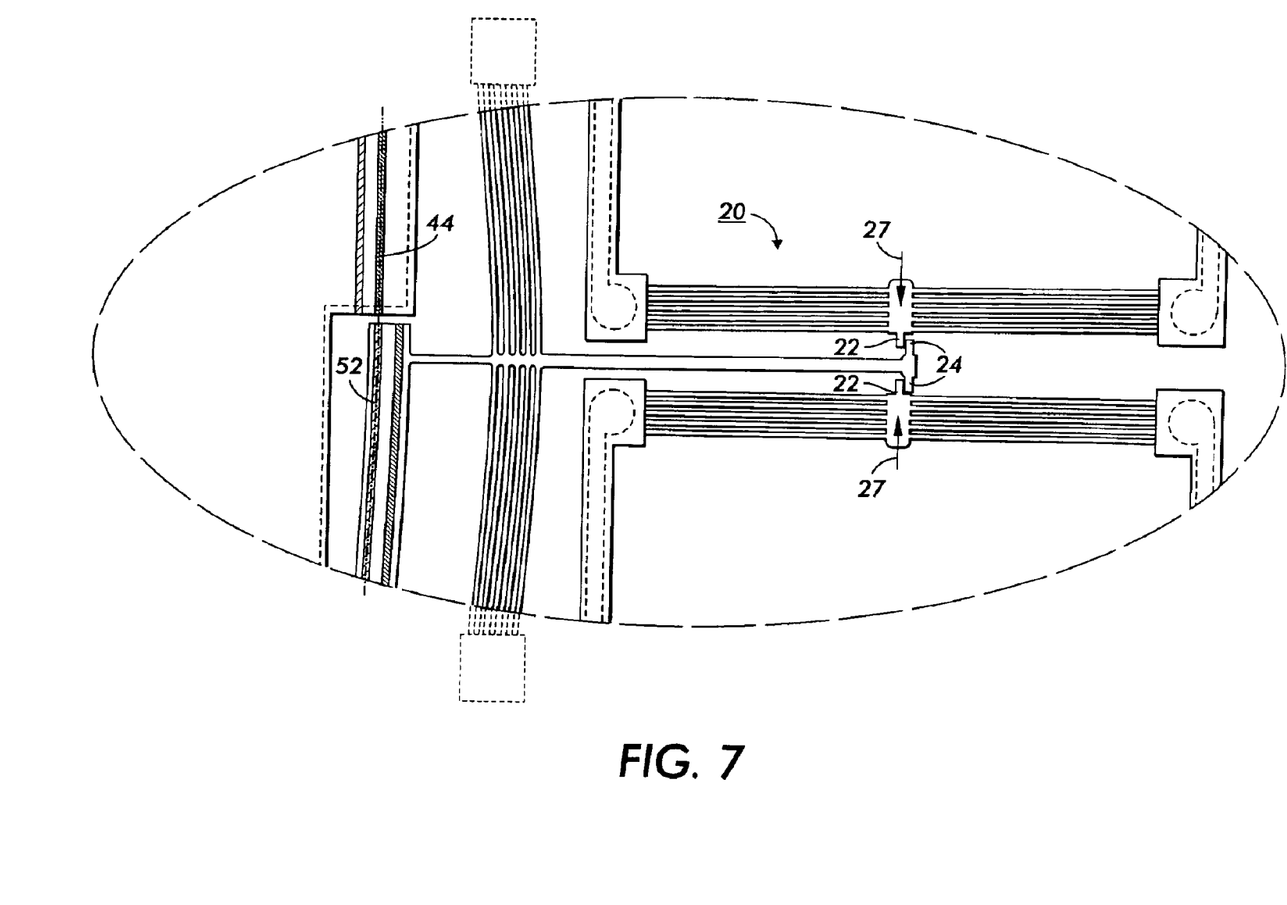
FIG. 7 is a top plan view showing the latching mechanism in the latched position.

FIG. 6 shows how the resulting thermal expansion of the drive actuator 30 is sufficient to move the flexible cantilever beam platform 50 and linkage 28 far enough to the right for the linkage teeth 24 to be well to the right side of the latch teeth 22. Next the latch actuator voltages return to zero, and the latch closes. To finish the latching sequence, the drive actuator voltages return to zero. As the drive actuator cools, the linkage teeth 24 are drawn in tension (direction 27) against the latch teeth 22 which holds the switch in the desired latched position as shown in FIG. 7. To return the switch to its original state, the same sequence of voltages are applied in the reverse timing, as shown in the unlatch portion of FIG. 4. Unlike switches with no latching capability, the optical MEMS latching switch 10 only consumes power during a change of state, and preserves its state, even if power is interrupted.

It should be noted that, although the timing diagram shown in FIG. 4 depicts square wave voltage pulses, this depiction is meant to be illustrative only of the basic timing, and does not preclude the use of other waveforms. Furthermore, the voltages applied to the thermal actuators need not be symmetric about zero. However, the use of equal but opposite polarity pulses, as described above, results in a constant zero voltage at the center of each actuator throughout the latch and unlatch cycle, which reduces electrostatic forces between the actuators and the handle wafer 60.

A logic table for the 2×2 switching function is as follows:

State One: Add/Drop function, as shown in FIG. 5

The left movable waveguide 52 (input) is optically aligned to the left stationary waveguide 42 (drop).

The right movable waveguide 54 (add) is optically aligned to the right stationary waveguide 44 (output).

State Two: Pass function, as shown in FIG. 7

The left movable waveguide 52 (input) is optically aligned to the right stationary waveguide 44 (output).

In order to change from state one to state two, a force F can be applied by a thermal drive actuator 30. In order to deflect the free end by a distance δx, a force F must be applied where F is given by:

$$F = (Ea^3 b/4L^3)\delta x$$

Where E is Young's modulus (E=1.65×10$^5$ $\mu$N/$\mu$m$^2$ for single crystal silicon), a is the thinner cross-sectional dimension of the beam 21, b is the thicker cross-sectional dimension of the beam and L is the length of the beam. For example, a 1000 $\mu$m long beam that is 5 $\mu$m thick and 20 $\mu$m wide would require a force of 13.2 $\mu$N to deflect the free end by 8 $\mu$m, which is sufficient deflection to switch a cantilever beam with two 4 $\mu$m waveguides.

The switching force F can be applied to the free end of the cantilever beam 50, or at an intermediate location, or locations as required. The switch can also be actuated in the opposite direction by applying a force F from the thermal drive actuator 30 in the opposite direction. In some cases it may be preferable to not use the equilibrium position of the cantilever beam, since these do not have a strong restoring force that returns them to this position since the cantilever beam may be quite long and flexible. Instead only deflected positions may be desirable to use. In addition, it may be advantageous to angle the receiving waveguides to better match the direction of propagation of the light leaving the deflected cantilever beam.

Since the cantilever beam carrying multiple waveguides could be wider than it is thick, it could suffer undesirable out of plane deflections since it is less stiff out of plane than it is in plane, as predicted by the formula $$K = (Ea/4)(b/L)^3$$

As an example for a beam that is 5 $\mu$m thick and 20 $\mu$m wide, the ratio of the stiffness in the horizontal direction of the vertical direction is (20/5)$^2$. The beam is 16 times stiffer in the horizontal direction relative to the vertical direction.

In order to avoid out of plane deflections the appropriate location along the cantilever beam 50 may be attached to a switch tether 34 so as to minimize these out of plane deflections. The beam's width may also be decreased at certain points to decrease its stiffness in the horizontal direction (e.g. serrated). Joints can be added to make the beam more flexible in the horizontal direction. The beam can be deflected bi-directionally to decrease the magnitude of the required deflection. The beam can be thickened or stiffened to make it less flexible in the out-of-plane direction (e.g. by making the beam thicker or by adding super structures such as additional beams).

The switches and the waveguides are made together on a single crystal silicon wafer using widely available semiconductor processing equipment. Such on-chip integration avoids the complex alignment issues associated with manually connecting different and larger components with optical fibers, and avoids the cost and space associated with manufacturing, assembling and packaging the separate components of optical switches. On-chip integration with other components can drive down the cost of manufacturing switches and installation of these complicated devices by a factor of ten or more. Currently, these components cost over $1,000 per channel.

FIGS. 8 through 11 shows two extensions 100 of the system embodiment depicted in FIG. 1. The first extension is to a higher order of switching, from 2×2 in FIG. 1 to 2×3 in FIG. 8. The second option shown in FIG. 9A is the introduction of a "hook"-hitch 132 and 134 instead of a simple tether. These two extensions are discussed below.

Figure 8:
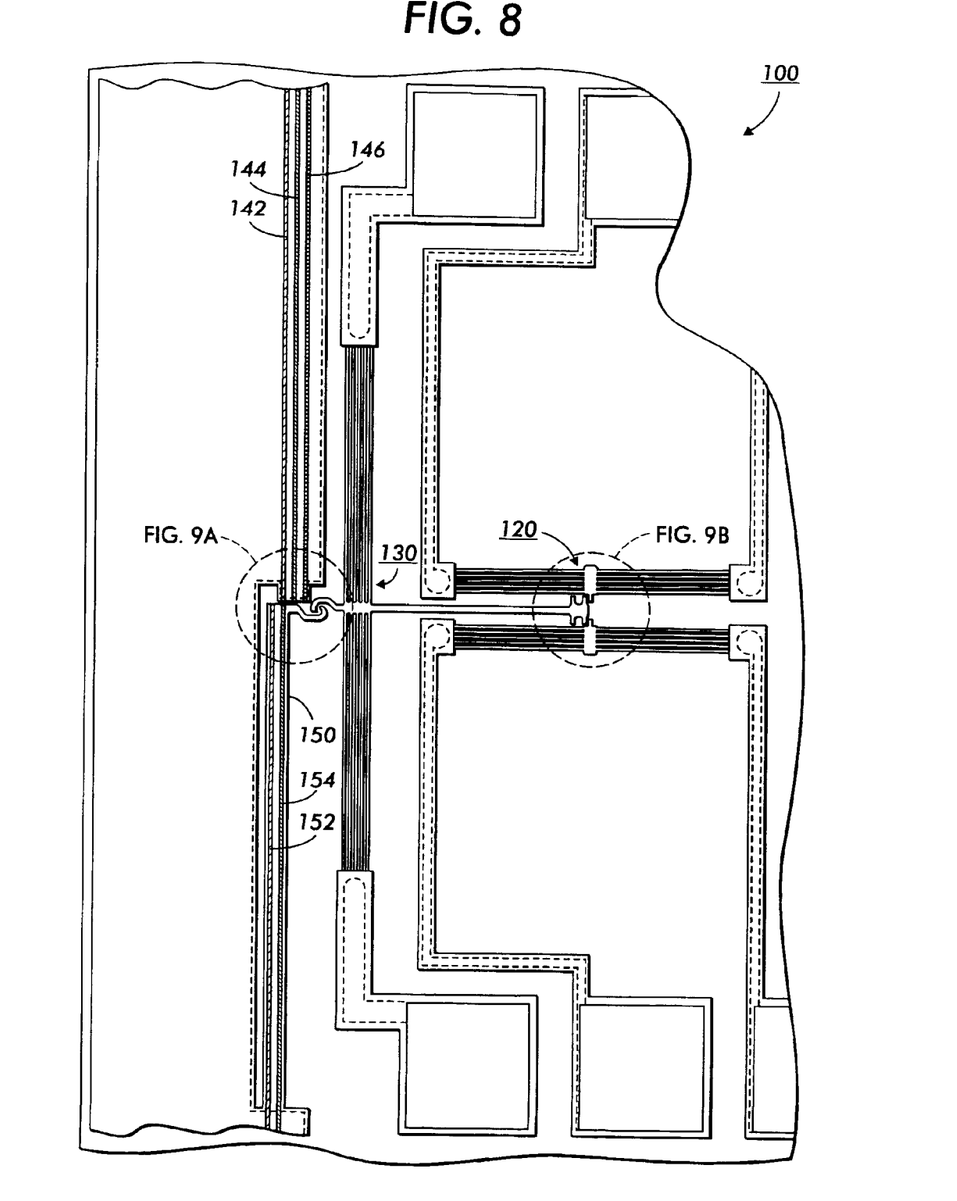
FIG. 8 is a cut away top plan view of an optical MEMS device with a "hook" hitch and latch teeth in accordance with another embodiment of the present invention.
Figure 9A:
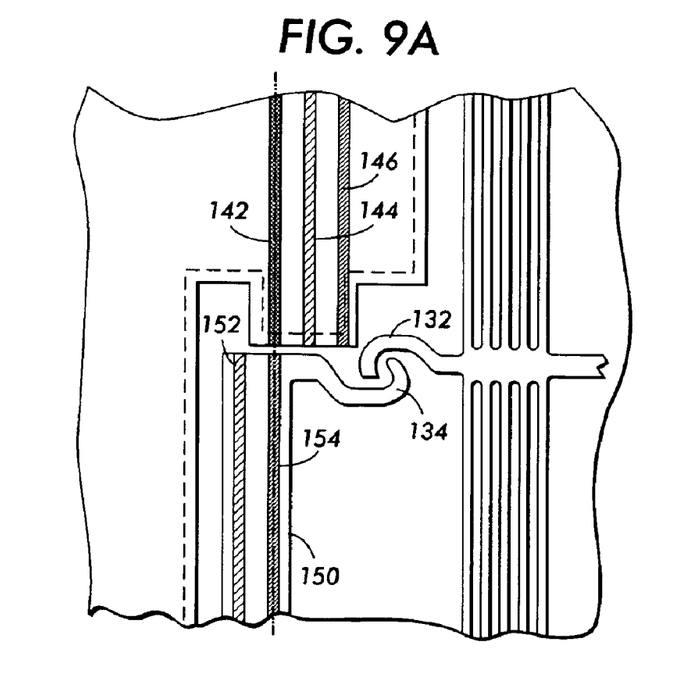
FIG. 9A is an enlarged view of a portion of FIG. 8 detailing the "hook" hitch in an equilibrium state.
Figure 9B:
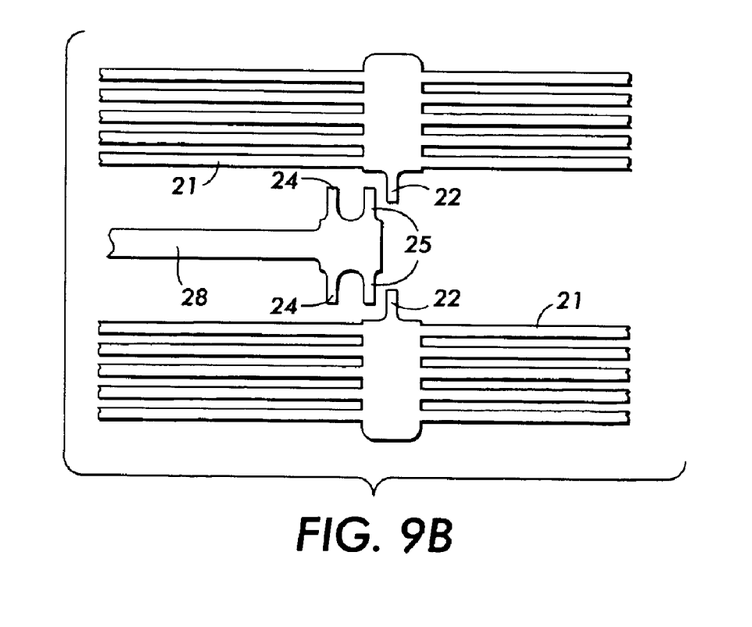
FIG. 9B is an enlarged view of a portion of FIG. 8 detailing the latch teeth in an equilibrium state.
Figure 10A:
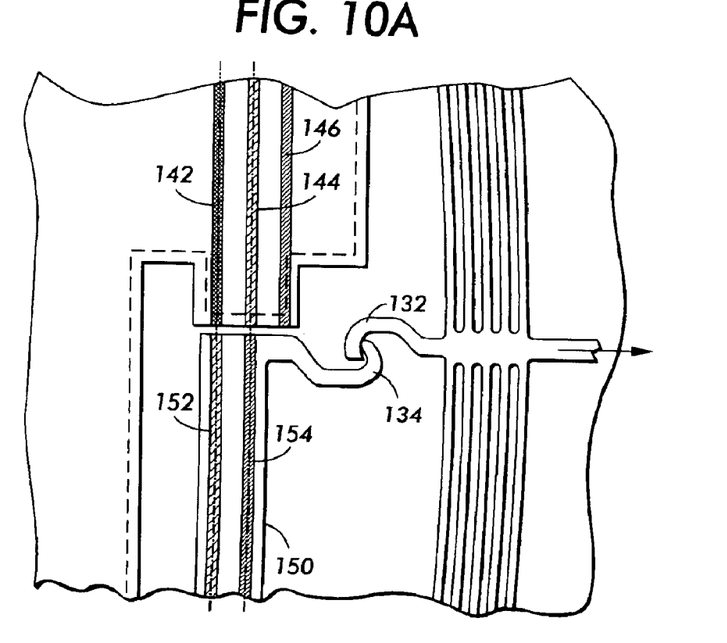
FIG. 10A is an enlarged view of a portion of FIG. 8 detailing the "hook" hitch in a first switch state.
Figure 10B:
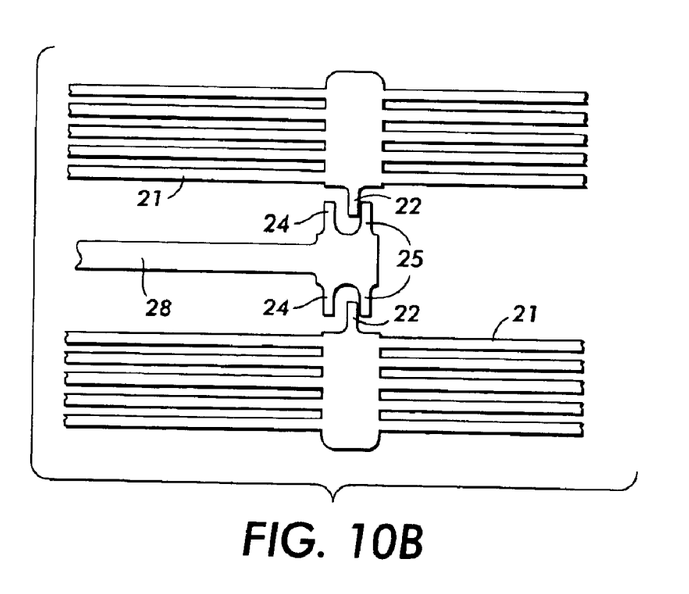
FIG. 10B is an enlarged view of a portion of FIG. 8 detailing the latch teeth in a first switch state.

To increase the system from a 2×2 switch to a 2×3 switch, two additional elements are required. The first is another stationary waveguide platform defining stationary waveguides 142, 144 and 146 respectively. The second element is an extra pair of teeth 25 on the linkage 28 located after the teeth set 24 as shown in FIG. 9B. For the initial state of the 2×3 switch, the latch teeth are disengaged as shown in FIG. 9B. In this position, the right most moveable waveguide 154 is aligned with the left most stationary waveguide 142 as shown in FIGS. 8 and 9A. Using an actuation sequence similar to the latching phase shown and described in FIG. 4, the switch can be moved to a second state as shown in FIG. 10B. Here the latch teeth 22 defined by the latch actuator 21 engage between the pair of teeth 24 and 25 on the linkage 28, and the two movable waveguides 152 and 154 are aligned with the left most pair of stationary waveguides 142 and 144 respectively, as shown in FIG. 10A. A third state can be achieved by executing another latching sequence with higher voltages on the drive. In this state, depicted in FIGS. 11A and 11B, the latch teeth 22 engages behind the pair of linkage teeth 24 and the two moveable waveguides 152 and 154 now align with the right most pair of stationary waveguides 144 and 146.

The 2×3 switch example discussed above, is one embodiment of the general ability to achieve N×M switching for small values of N and M. Each N×M configuration requires a sufficient number of fixed and movable waveguides. Further design considerations may be accounted for to achieve the desired set of switch positions. These include the initial relative alignment and spacing of the moveable and stationary waveguides, as well as, the number and relative location of the linkage teeth.

The second option shown in FIGS. 8 through 11 is the substitution of an interlocking "hook" hitch 132 and 134 for the tether 34. Depending on the embodiment and fabrication processes employed, the "hook" hitch may be used to mitigate the affects of stresses that may degrade the switch performance. For example, if the process were to induce stress in the drive actuator 30, the stress could be transferred through a tether 34, and impact the equilibrium state alignment of the waveguides. The "hook" hitch mechanically decouples the drive actuator 130 from the moveable waveguide platform 150 in the equilibrium state, thereby eliminating any transferred stress that would induce a misalignment in the equilibrium state.

Figure 11A:
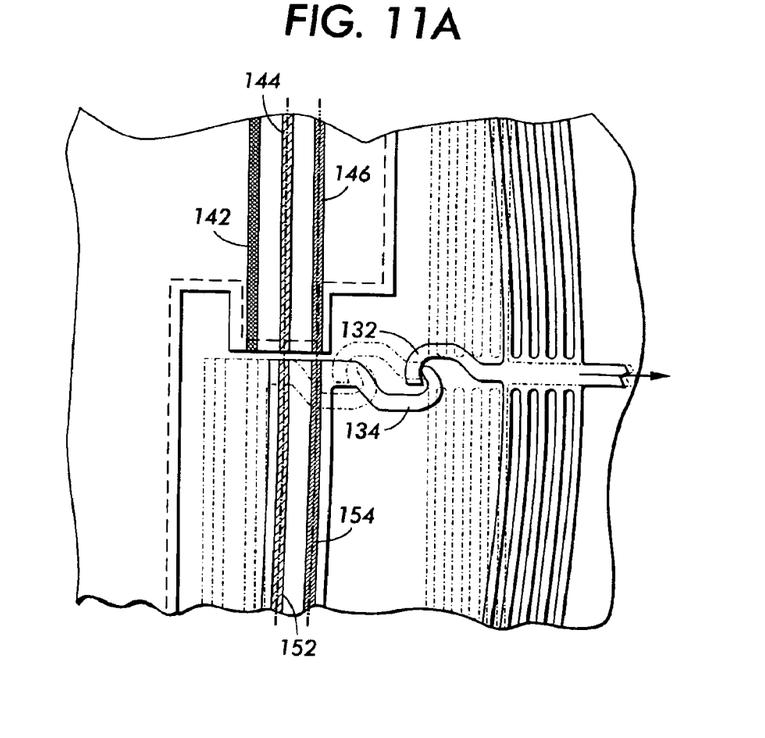
FIG. 11A is an enlarged view of a portion of FIG. 8 detailing the "hook" hitch in a second switch state.
Figure 11B:
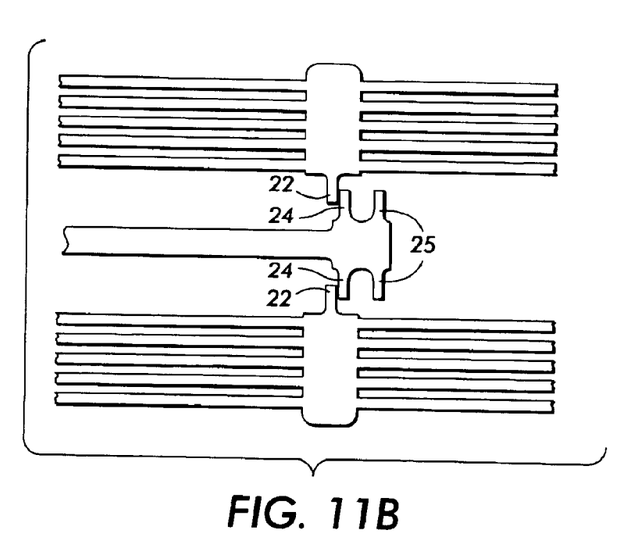
FIG. 11B is an enlarged view of a portion of FIG. 8 detailing the latch teeth in a second switch state.

The "hook" hitch also mitigates stresses that occur in latched states that lead to undesirable rotations in the linkage. As the unanchored end of the cantilevered waveguide platform is pulled to the right, the translational motion of the platform is accompanied by a small clockwise rotation due to the bending of the cantilevered platform. If a simple tether is used, the rotation of the waveguide platform bends the tether 34, which in turn causes a counter clockwise rotation of the linkage 28, and may also asymmetrically distort the drive actuator. The rotation of the linkage and asymmetric distortion of the actuator is most severe in systems that require larger displacements. The "hook" hitch, however, provides a good counter measure for these issues. As seen in FIG. 11A the "hook" hitch combination 132 and 134 provides a pivot point at the contact point between the left hook 134 attached to the cantilevered waveguide beam platform and the right hook 132 attached to the thermal drive actuator. The "hook" hitch thereby decouples the rotational motion of the cantilevered waveguides from the rest of the system, allowing the linkage and drive to operate without induced rotations.

The invention may be embodied in other specific forms without departing from its spirit or essential characteristics. The described embodiments are to be considered in all respect only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A micro-electro-mechanical system optical switch, comprising:
    a cantilever beam optical switch associated with a plurality of optical waveguides formed on a flexible cantilever beam for switching optical states.

2. The micro-electro-mechanical system optical switch according to claim 1, wherein a switching force is applied to a free end of said flexible cantilever beam.

3. The micro-electro-mechanical system optical switch according to claim 1, wherein said cantilever beam optical switch has multiple deflected positions.

4. The micro-electro-mechanical system optical switch according to claim 1, wherein angling one or more receiving waveguides match an angle of deflection of said optical waveguides of said cantilever beam.

5. The micro-electro-mechanical system optical switch according to claim 1, wherein said cantilever beam optical switch beam's width is decreased at certain points to decrease said cantilever beams stiffness in a horizontal direction.

6. The micro-electro-mechanical system optical switch according to claim 1, wherein said cantilever beam optical switch is deflected bi-directionally to decrease a magnitude of a required deflection.

7. The micro-electro-mechanical system optical switch according to claim 1, wherein said cantilever beam is thickened to make it less flexible in an out-of-plane direction.

8. The micro-electro-mechanical system optical switch according to claim 1, wherein said cantilever beam is stiffened to make it less flexible in an out-of-plane direction.

9. The micro-electro-mechanical system optical switch according to claim 1, wherein cantilever beam optical switch is actuated in one direction by applying a force from a system of drive and latch actuators in an opposite direction.

10. The micro-electro-mechanical system optical switch according to claim 1, wherein said cantilever beam is fabricated in a device layer of an SOI wafer and released by sacrificial etching of a buried oxide layer.

11. A method for micro-electro-mechanical system optical switching, comprising:
    switching optical states by a cantilever beam optical switch associated with a plurality of optical waveguides formed on a flexible cantilever beam using a system of drive and latch actuators.

12. The method according to claim 11, further comprising a switching force applied to a free end of said flexible cantilever beam.

13. The method according to claim 11, further comprising deflecting said cantilever beam optical switch in multiple positions.

14. The method according to claim 11, further comprising angling one or more receiving waveguides to match an angle of deflection of said optical waveguides of said cantilever beam.

15. The method according to claim 11, further comprising decreasing said cantilever beam optical switch beam's width at certain points to decrease said cantilever beams stiffness in a horizontal direction.

16. The method according to claim 11, further comprising deflecting said cantilever beam optical switch bi-directionally to decrease a magnitude of a required deflection.

17. The method according to claim 11, further comprising thickening said cantilever to make it less flexible in an out-of-plane direction.

18. The method according to claim 11, further comprising stiffening said cantilever beam to make it less flexible in an out-of-plane direction.

19. An optical micro-electro-mechanical system switch system, comprising:

means for switching optical states using a cantilever beam optical switch associated with a plurality of optical waveguides formed on a flexible cantilever beam by a system of drive and latch actuators.

20. The system according to claim 19, further comprising means for applying a switching force to a free end of said flexible cantilever beam.

* * * * *